United States Patent
Kowalski et al.

(10) Patent No.: US 8,514,796 B2
(45) Date of Patent: *Aug. 20, 2013

(54) TRANSMITTING CONTROL DATA AND USER DATA ON A PHYSICAL UPLINK CHANNEL

(75) Inventors: John Michael Kowalski, Camas, WA (US); Prem Lal Sood, Vancouver, WA (US); Zhanping Yin, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 628 days.

This patent is subject to a terminal disclaimer.

(21) Appl. No.: 12/753,007

(22) Filed: Apr. 1, 2010

(65) Prior Publication Data

US 2011/0243103 A1    Oct. 6, 2011

(51) Int. Cl.
*H04W 4/00* (2009.01)
*H04J 3/20* (2006.01)
*H04B 7/00* (2006.01)
*H04B 7/216* (2006.01)

(52) U.S. Cl.
USPC ............ 370/329; 370/308; 370/310; 370/335

(58) Field of Classification Search
USPC ................ 370/310–318, 319, 321, 329, 336, 370/344, 347, 350, 431, 437, 442
See application file for complete search history.

(56) References Cited

U.S. PATENT DOCUMENTS

| 2007/0076587 A1* | 4/2007 | Kwon et al. ................. 370/208 |
| 2008/0219236 A1 | 9/2008 | Love et al. |
| 2008/0316959 A1* | 12/2008 | Bachl et al. .................. 370/329 |
| 2009/0010240 A1 | 1/2009 | Papasakellariou et al. |
| 2009/0245148 A1* | 10/2009 | McCoy ......................... 370/310 |
| 2010/0002800 A1 | 1/2010 | Kim et al. |
| 2010/0039928 A1 | 2/2010 | Noh et al. |
| 2010/0098012 A1* | 4/2010 | Bala et al. ..................... 370/329 |

OTHER PUBLICATIONS

3GPP TS 36.211 V9.0.0, "Evolved Universal Terrestrial Radio Access (E-UTRA); Physical Channels and Modulation (Release 9)," Dec. 2009.
3GPP TS 36.300 V9.0.0, "Evolved Universal Terrestrial Radio Access (E-UTRA) and Evolved Universal Terrestrial Radio Access Network (E-UTRAN); Overall Description; Stage 2 (Release 9)," Jun. 2009.
Ericsson, ST-Ericsson, "A/N Transmission in the Uplink for Carrier Aggregation," R1-100909, Feb. 2010.
Qualcomm Europe, "Support of Concurrent Transmission of PUCCH and PUSCH in LTE-A Uplink," R1-090362, Jan. 2009.
3GPP TS 36.212 V9.0.0, "Evolved Universal Terrestrial Radio Access (E-UTRA); Multiplexing and Channel Coding (Release 9)," Dec. 2009.
Sharp, "PUSCH Control Formats for CM Minimization at Cell Edge," 3GPP TSG-RAN WG1 #58bis, R1-094024, Oct. 2009.
LG Electronics, "UCI Piggyback onto PUSCH in LTE-Advanced for CM Preserving," 3GPP TSG RAN WG1 #59, R1-094469, Nov. 2009.
NTT DoCoMo, "Clarification of UCI Transmission Scheme with Simultaneous Data Transmission," 3GPP TSG RAN WG1 Meeting #60, R1-101210, Feb. 2010.
International Search Report issued for International Patent Application No. PCT/JP2011/058668 on May 17, 2011.

* cited by examiner

*Primary Examiner* — Ian N Moore
*Assistant Examiner* — Kiet Tang
(74) *Attorney, Agent, or Firm* — Austin Rapp & Hardman

(57) ABSTRACT

A method for transmission of control data and user data on a Physical Uplink Channel (PUC) is disclosed. An instruction from a base station to use an uplink control channel and an uplink shared channel to transmit uplink data is received. Control data and user data on the uplink control channel and the uplink shared channel is transmitted.

16 Claims, 15 Drawing Sheets

TRANSMITTING CONTROL DATA AND USER DATA ON A PHYSICAL UPLINK CHANNEL

TECHNICAL FIELD

The present invention relates generally to wireless communications and wireless communications-related technology. More specifically, the present invention relates to transmitting control data and user data on a Physical Uplink Channel (PUC).

BACKGROUND

Wireless communication devices have become smaller and more powerful in order to meet consumer needs and to improve portability and convenience. Consumers have become dependent upon wireless communication devices and have come to expect reliable service, expanded areas of coverage, and increased functionality. A wireless communication system may provide communication for a number of cells, each of which may be serviced by a base station. A base station may be a fixed station that communicates with mobile stations.

A wireless communication device may communicate with one or more base stations via transmissions on the uplink and the downlink. The uplink (or reverse link) refers to the communication link from the wireless communication device to the base station, and the downlink (or forward link) refers to the communication link from the base station to the wireless communication device. A wireless communication system may simultaneously support communication for multiple mobile stations.

Various signal processing techniques may be used in wireless communication systems to improve efficiency and quality of wireless communication. One such technique may include sending control data to a base station. The control data may be used to determine various operational parameters of the wireless communication system. Therefore, benefits may be realized by improved techniques for transmitting control data.

DETAILED DESCRIPTION

Figure 1:
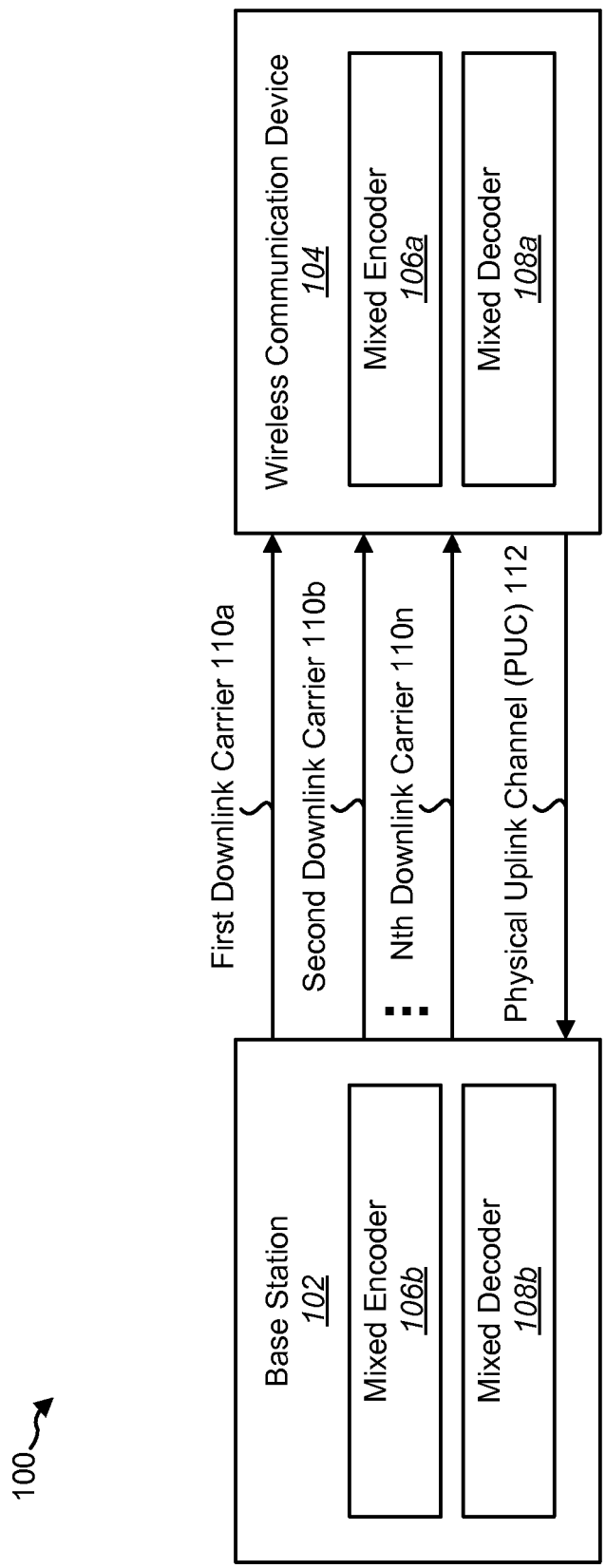
FIG. 1 is a block diagram illustrating a wireless communication system for transmitting control data and user data on a Physical Uplink Channel (PUC)

In the $3^{rd}$ Generation Partnership Project (3GPP) cellular communication standard known as Long Term Evolution-Advanced (LTE-Advanced), also called "Release 10" LTE, LTE-A, or Release 10 for short, control information may include channel quality information, acknowledgment/non-acknowledgment (ACK/NAK) information, schedule requests, etc. In Release 10, the control information may be aggregated on a single uplink carrier control channel when there are multiple downlink carriers transmitting to a single User Equipment (UE).

It may be desirable for the transmission of uplink control information to be compatible with the control information from prior releases, specifically Release 8 LTE, referred to herein as "LTE." In LTE, according to $3^{rd}$ Generation Partnership Project (3GPP) TS 36.211, the uplink control information is periodically transmitted on the Physical Uplink Control Channel (PUCCH). According to TS 36.211, the physical resources used for the PUCCH depend on two parameters $N_{RB}^{(2)}$ and $N_{cs}^{(1)}$, given by higher layers. The variable $N_{RB}^{(2)} \geq 0$ denotes the bandwidth in terms of resource blocks that are available for use by PUCCH formats 2/2a/2b transmission in each slot. The variable $N_{cs}^{(1)}$ denotes the number of cyclic shifts used for PUCCH formats 1/1a/1b in a resource block used for a mix of formats 1/1a/1b and 2/2a/2b. (See 3GPP TS 36.211 v9.0.0, "Evolved Universal Terrestrial Radio Access (E-UTRA) and Evolved Universal Terrestrial Radio Access Network (E-UTRAN); Physical Channels and Modulation (Release 9)," Section 5.4.)

In addition, TS 36.300 describes the PUCCH as being mapped to a control channel resource in the uplink. A basic block of control channel resource is defined by a code and two resource blocks, consecutive in time, with hopping at the slot boundary. (See 3GPP TS 36.300, "Evolved Universal Terrestrial Radio Access (E-UTRA) and Evolved Universal Terrestrial Radio Access Network (E-UTRAN); Overall description; Stage 2 (Release 9)," Section 5.2.3.)

For Release 10, a plurality of basic blocks of control channel resources may be assigned to a single UE for a single PUCCH, since the PUCCH is a "tight" channel in terms of resource usage. The PUCCH may also be interference limited under typical circumstances as well as accessed using code-division multiple access (CDMA). Thus, it may be desirable to minimize the effect of additional PUCCH transmissions of aggregated data.

However, when periodic feedback of the PUCCH is configured, and this period coincides with the transmission of periodic uplink user data on the Physical Uplink Shared Channel (PUSCH), it may be desirable to transmit the PUCCH and PUSCH together. Because of the desire to minimize Release 8 control channel resources, it may be advantageous to transmit both control data and user data simultaneously on a single concatenated physical channel. The present systems and methods include a process and a coding methodology that maximally exploits both existing LTE channel codes and allows for minimal interference to UEs using Release 8 formats, and does this for all control information that may be sent.

The present systems and methods may also include a coding technique that exploits the marginal distribution of two messages to enhance the coding performance of each other.

A method for transmission of control data and user data on a Physical Uplink Channel (PUC) is disclosed. An instruction from a base station to use an uplink control channel and an uplink shared channel to transmit uplink data is received. Control data and user data on the uplink control channel and the uplink shared channel is transmitted.

In one configuration, the transmitting on the uplink control channel and the uplink shared channel may be simultaneous. The uplink control channel may be a Physical Uplink Control Channel (PUCCH) in a Long Term Evolution (LTE) system and the uplink shared channel may be a Physical Uplink Shared Channel (PUSCH) in an LTE system.

A reference signal with a length of $M=\phi*N$ may also be transmitted, where $\phi$ is a combined number of resource blocks in the uplink control channel and uplink shared channel and N is a size of the resource blocks in the frequency domain, expressed as a number of subcarriers.

The control data may include feedback data for a plurality of downlink carriers. Specifically, the control data may be one or more of a channel quality information (CQI), acknowledgment/non-acknowledgment data (ACK/NACK), precoding matrix indication (PMI), scheduling request (SR) or a rank indicator (RI).

The control data and the user data may be coded together using mixed coding. Bits in the user data may be removed. Bits in the control data may be repeated to increase the number of bits in the control data. A number of bits in the user data that is the same as the number of bits in the control data may be copied. The copied user data bits may be added to the control data. The user data and the control data may be multiplexed.

The repeating may include copying bits in the control data k*m times, where k is a constant determined based on the type and size of the control data, a resource allocation offset, β-offset, and a modulation and coding scheme (MCS), and m is a repetition scalar determined based on the resource allocation offset, β-offset. The adding may include a bitwise exclusive or (XOR) operation. The multiplexing may include time division multiplexing (TDM) and channel multiplexing.

A wireless device for transmission of control data and user data on a Physical Uplink Channel (PUC) is also disclosed. The apparatus includes a processor and memory in electronic communication with the processor. Executable instructions are stored in the memory. The instructions are executable to receive an instruction from a base station to use an uplink control channel and an uplink shared channel to transmit uplink data. The instructions are also executable to transmit control data and user data on the uplink control channel and the uplink control channel.

A computer-readable medium comprising executable instructions for transmission of control data and user data on a Physical Uplink Channel (PUC) is also disclosed. The instructions are executable for receiving an instruction from a base station to use an uplink control channel and an uplink shared channel to transmit uplink data. The instructions are also executable for transmitting control data and user data on the uplink control channel and the uplink shared channel.

FIG. 1 is a block diagram illustrating a wireless communication system 100 for transmitting control data and user data on a Physical Uplink Channel (PUC) 112. A base station 102 may be in wireless communication with one or more wireless communication devices 104. A base station 102 may be referred to as an access point, a Node B, an eNodeB, or some other terminology. Likewise, a wireless communication device 104 may be referred to as a mobile station, a subscriber station, an access terminal, a remote station, a user terminal, a terminal, a handset, a subscriber unit, user equipment, or some other terminology. The base station 102 may transmit data to the wireless communication device 104 over a radio frequency (RF) communication channel. More specifically, the base station 102 may transmit data to the wireless communication device 104 using one or more downlink carriers 110a-n, e.g., using multiple Orthogonal Frequency Division Multiplexing (OFDM) carriers. Therefore, a first downlink carrier 110a, a second downlink carrier 110b, and an Nth downlink carrier 110n may be used to carry information from the base station 102 to the wireless communication device 104.

In Release 10, ACK/NAK transmissions may be transmitted on the Physical Uplink Control Channel (PUCCH) using Discrete Fourier Transform-Spread OFDM (DFT-Spread OFDM), which is the modulation used for the Physical Uplink Shared Channel (PUSCH). If DFT-Spread OFDM is used for all control channel formats for aggregated transmission, then the PUSCH and PUCCH data may be generated using the same mechanism, as they both share the same modulation formats. If they do share the same modulation formats, then a mechanism that gives, for the same SINR, error rates related to the individual requirements of the PUSCH and user data may be desirable. Furthermore, DFT-Spread OFDM may allow for a lower Peak to Average Power Ratio (PAPR) or Cubic Metric, meaning that less battery power is needed to transmit the required control information and user data.

Toward that end, the wireless communication device 104 may include a mixed encoder 106a that uses DFT-Spread OFDM modulation for use in all control formats, including for the transmission of periodic information on an aggregated PUSCH/PUCCH. In Release 8, user data on PUSCH may be transmitted using DFT-Spread-OFDM, but control data on PUCCH may not be transmitted using DFT-Spread-OFDM. Rather, the coded control data may be fed into a resource element mapper by multiplying a cyclic shifted orthogonal sequence, more like OFDM. Also, PUCCH and PUSCH may not be transmitted simultaneously. The coding and physical mapping are described in 3GPP TS 36.211.

However, since the PUCCH may also be used to transmit channel quality information (CQI), the present systems and methods may use the same modulation method to convey both the PUCCH and PUSCH. Furthermore, in the case where PUCCH and PUSCH are transmitted simultaneously using DFT-Spread OFDM, the distinctions between an uplink control channel and an uplink shared channel vanish. Therefore, as used herein, the term "Physical Uplink Channel (PUC)" 112 refers to the combined aggregated uplink control channel and uplink shared channel, e.g., the combined PUCCH and PUSCH.

In addition to transmitting control data and user data on an aggregated PUC 112, the wireless communication device 104 may also employ mixed coding and decoding with a mixed encoder 106a and a mixed decoder 108a, respectively. Similarly, the base station 102 may also include a mixed encoder 106b and a mixed decoder 108b capable of using the mixed coding scheme. The mixed encoders 106 may introduce dependency between control data and user data using a partial superposition code, in which control data is coded over a repeated portion of user data. In one configuration, the wireless communication system 100 is an LTE system and the mixed encoder 106 re-uses some or all existing user data and control data coding schemes in LTE release 8 with one binary adding step at the encoding. Different feedback levels may be used to get different levels of performance enhancement.

The mixed decoder 108 may decode a received signal and produce user data and control data. For fast control decoding, the repeated portion of the data message may be selected so that the decoding of the control data achieves at least the same performance as in time division multiplexing (TDM). Due to the differential decoding nature of the repeated user data cancellation used by the mixed decoder 108, the user data portion that is mapped and added to the control message may be approximately twice that of the control message in TDM version. Thus, some puncturing may be performed on the user data to give enough space. This may cause some loss on the user data performance. However, after successful decoding of the control message, the repeated user data block may be recovered by canceling the control coding at the superposition portion. The repetition of the user data block may improve the performance on the data decoding. Therefore, the coding gain from the repetition may be higher than the loss from the extra puncturing, thus overall gain may be achieved on user data in addition to control data. Furthermore, with the feedback from user data, the control performance may be further enhanced. By adjusting the mapped portion, better performance may be observed on both user data and control data compared with release 8 of TDM.

Thus, the mixed coding scheme may utilize the better error protection on control data to give positive feedback on user data, and less error output of a user data decoder to give positive feedback on control data. The performance of the system 100 may be greatly enhanced by the introduced mutual information. Furthermore, the present systems and methods are not limited to one control message, i.e., multiple control messages with different control parameters called β-offsets may be used in the same manner. A β-offset for a control message defines the relative redundancy required over the data. The values of β-offsets may be decided by higher layer signaled indexes.

Therefore, the mixed coding scheme include a coding method to joint code two different messages with unequal error protection (UEP) requirements, a decoding process with different levels of feedback and performance enhancement, and a partial unequal error protection (UEP) implementation for different user data/control data ratios. Alternatively, the present systems and methods may use an aggregated Physical Uplink Channel (PUC) without the mixed coding scheme.

Therefore, the present systems and methods may include the following characteristics:

1. The use of PUCCH resources aggregated with PUSCH resources in transmitting DFT-Spread OFDM for uplink control information including Channel Quality Information (CQI), Precoding Matrix Indication (PMI), Rank Indication (RI), Scheduling Request (SR), etc., coincident with a PUSCH.
2. The use of a DFT-Spread OFDM modulator that spreads, simultaneously, user data and Uplink Control Information and ACK/NAK, giving feedback from a plurality of downlink carriers, onto physical channel resources in the PUCCH and the PUSCH, where these frequency carriers reside in one or more of the LTE PUCCH control regions and the PUSCH resources.
3. A combined PUCCH and PUSCH channel using a reference signal sequence length equal to $M_{sc}^{RS}=\phi N_{sc}^{RB}$, where φ is the number of resource blocks in the combined bandwidth that was in the control region for the PUCCH as well as the PUSCH.
4. The use of a mixed coding scheme to channel code ACK/NACK onto user data, where the total number of time/frequency resources is equal to that in the PUSCH region plus the number of PUCCH regions assigned.
5. The configuration of user equipment (UE) by a base station or eNodeB to transmit user data and control information in the manner described herein.

Figure 2:
FIG. 2 is a block diagram illustrating a radio frame.

FIG. 2 is a block diagram illustrating a radio frame 214. The wireless communication system 100 illustrated in FIG. 1 may operate on a frame 214 basis. Each frame 214 may include multiple subframes 218 that each may include one or more slots 216. The following are examples of possible values for lengths of data in the system 100, although other values may be used:

1. $T_s=1/(15000\times 2048)$ seconds
2. $T_f=307200 \cdot T_s=10$ ms=1 radio frame
3. $T_{slot}=15360 \cdot T_s=0.5$ ms, numbered from 0 to 19 in each radio frame where $T_s$ is the smallest unit of time measured, $T_f$ is the length of a radio frame 214 in terms of $T_s$, and $T_{slot}$ is the length of a slot 216 in terms of $T_s$.

Figure 3:
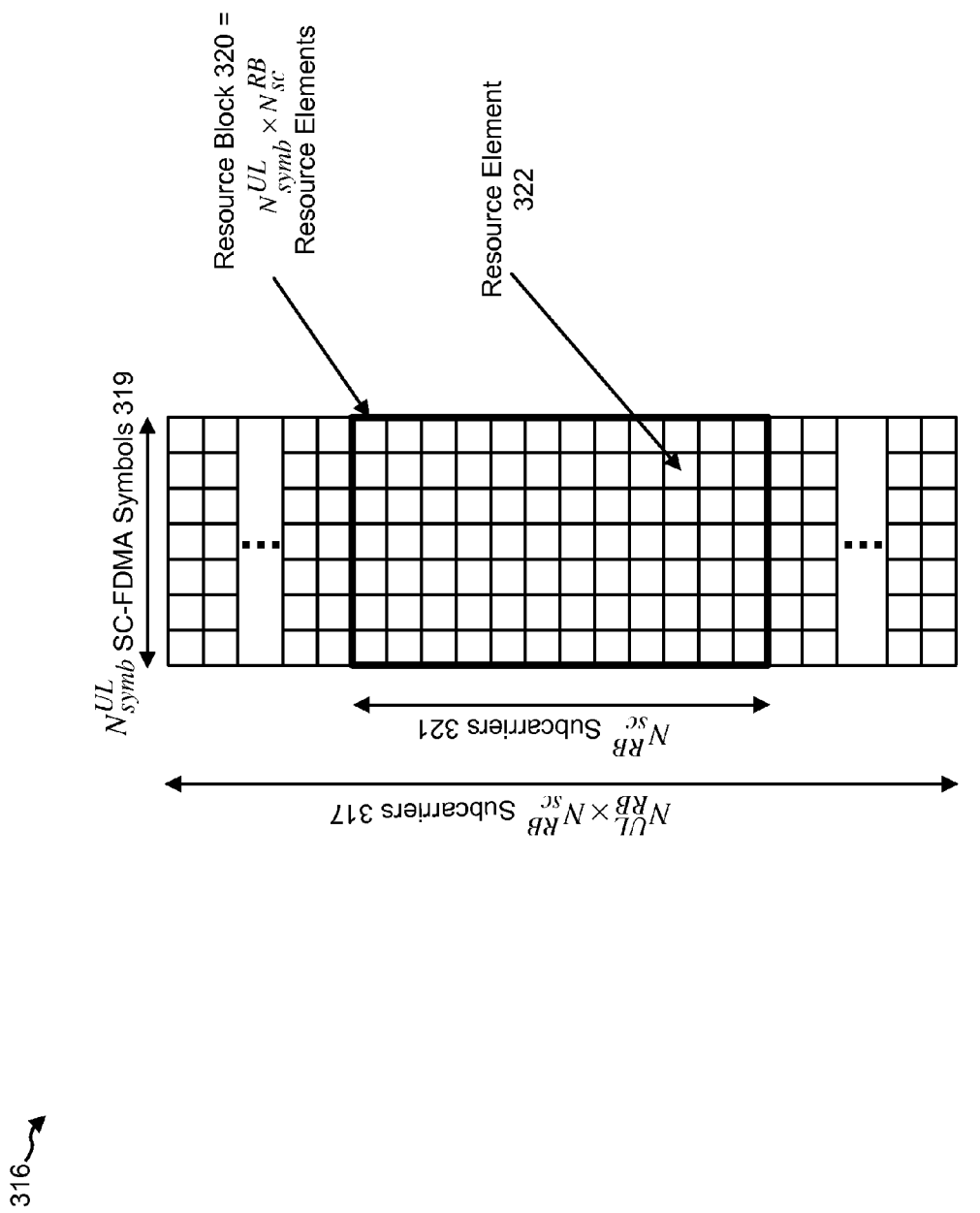
FIG. 3 is a block diagram illustrating a resource block.

FIG. 3 is a block diagram illustrating a slot 316. Each slot 316 may include $N_{RB}^{UL}N_{sc}^{RB}$ subcarriers 317 and $N_{symb}^{UL}$ SC-FDMA symbols 319 when $N_{RB}^{UL}$ resource blocks are allocated. A physical resource block 320 in the uplink may include $N_{symb}^{UL}\times N_{sc}^{RB}$ resource elements 322, and may correspond to one slot 316 in the time domain and 180 kHz in the frequency domain. The number of subcarriers in a resource block ($N_{sc}^{RB}$) 321, and the number of symbols in a slot ($N_{symb}^{UL}$) 319 may be defined in the Table 1.

TABLE 1

| Configuration | $N_{sc}^{RB}$ | $N_{symb}^{UL}$ |
|---|---|---|
| Normal cyclic prefix | 12 | 7 |
| Extended cyclic prefix | 12 | 6 |

In one configuration, $K \geq 1$ basic blocks of PUCCH frequency resources may be allocated on the uplink, as may be anticipated for future deployments of LTE, and $M_{RB}^{PUSCH}$ resource blocks are allocated for the user data transmission in the PUSCH, as in Release 8 of LTE. In this configuration, a total of $K+M_{RB}^{PUSCH}$ resource blocks 320 may be available for information transmission. This information may be user data, higher layer control information, or PHY control information.

Figure 4:
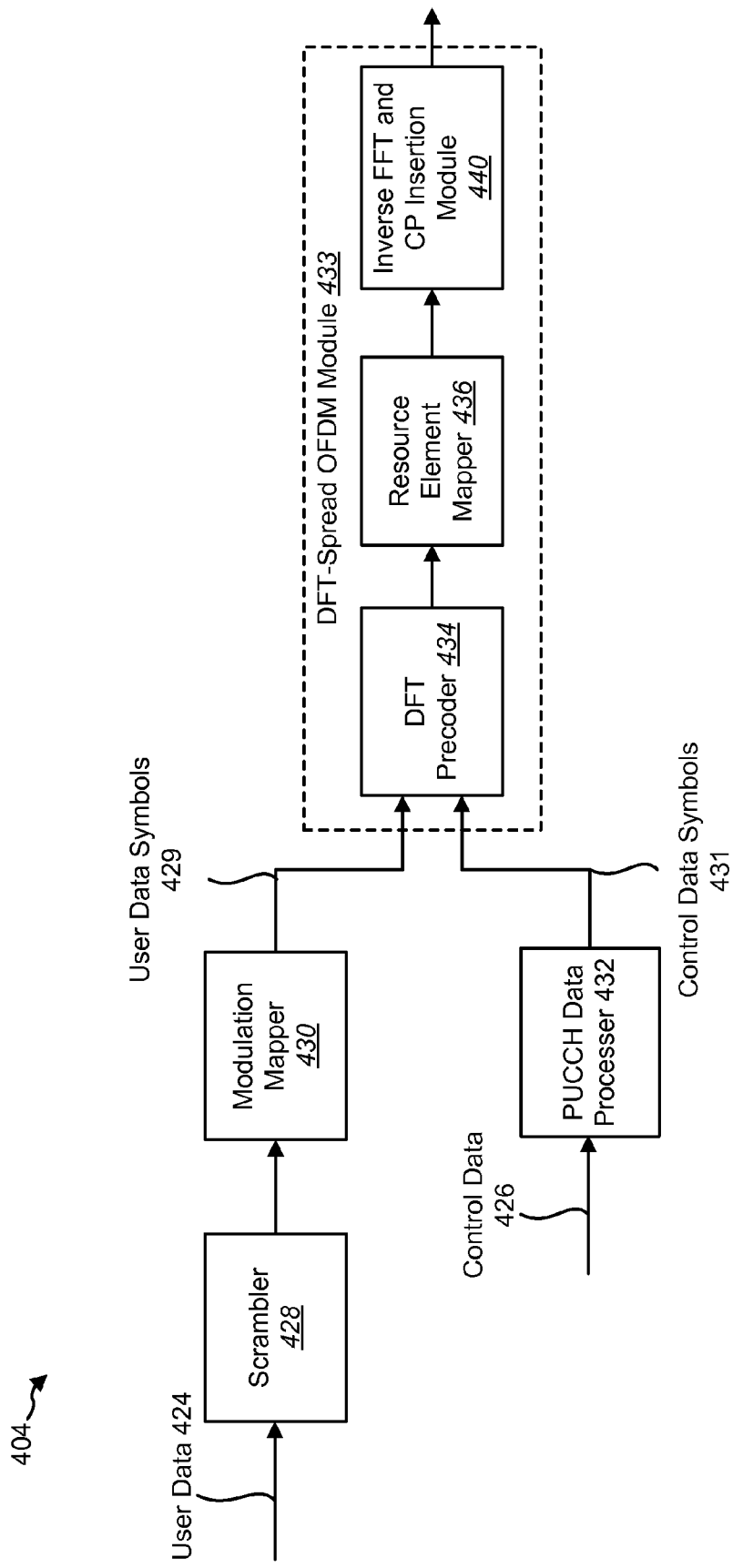
FIG. 4 is a block diagram illustrating portions of a wireless communication device for transmitting user data and control data on a Physical Uplink Channel (PUC)

FIG. 4 is a block diagram illustrating portions of a wireless communication device 404 for transmitting user data 424 and control data 426 on a Physical Uplink Channel (PUC). The wireless communication device 404 may process user data 424 and control data 426, i.e., uplink control information and ACK/NACK data. As used herein, the term "user data" or "shared data" refers to data typically sent on an uplink shared channel, such as a PUSCH, e.g., voice data. As used herein, the term "control data" refers to data typically sent on an uplink control channel, such as a PUCCH, e.g., ACK/NACK data, scheduling information, etc.

A scrambler 428 may scramble the user data 424. A modulation mapper 430 may modulate the scrambled bits to generate user data symbols 429, e.g., using quadrature phase-shift keying (QPSK), 16-quadrature amplitude modulation (16QAM), 64-quadrature amplitude modulation (64QAM), etc. A PUCCH data processor 432 may process control data 426. This may include modulating the control data 426 to generate control data symbols 431, e.g., using binary phase-shift keying (BPSK), QPSK, etc. A DFT-Spread OFDM module 433 may include a Discrete Fourier Transform (DFT) precoder 434, a resource element mapper 436, and an inverse FFT and cyclic prefix (CP) insertion module 440. The DFT precoder 434 may receive the user data symbols 429 and the control data symbols 431 and generate additional complex-valued symbols. The resource element mapper 436 may map the additional complex-valued symbols to resource elements 322. The inverse FFT and CP insertion module 440 may generate a complex-valued time-domain Single Carrier Frequency Division Multiple Access (SC-FDMA) signal for one or more antennas. Specifically, the inverse FFT and CP insertion module 440 may perform inverse FFT and CP insertion to generate the complex signals to be transmitted on one or more antenna ports.

Figure 5:
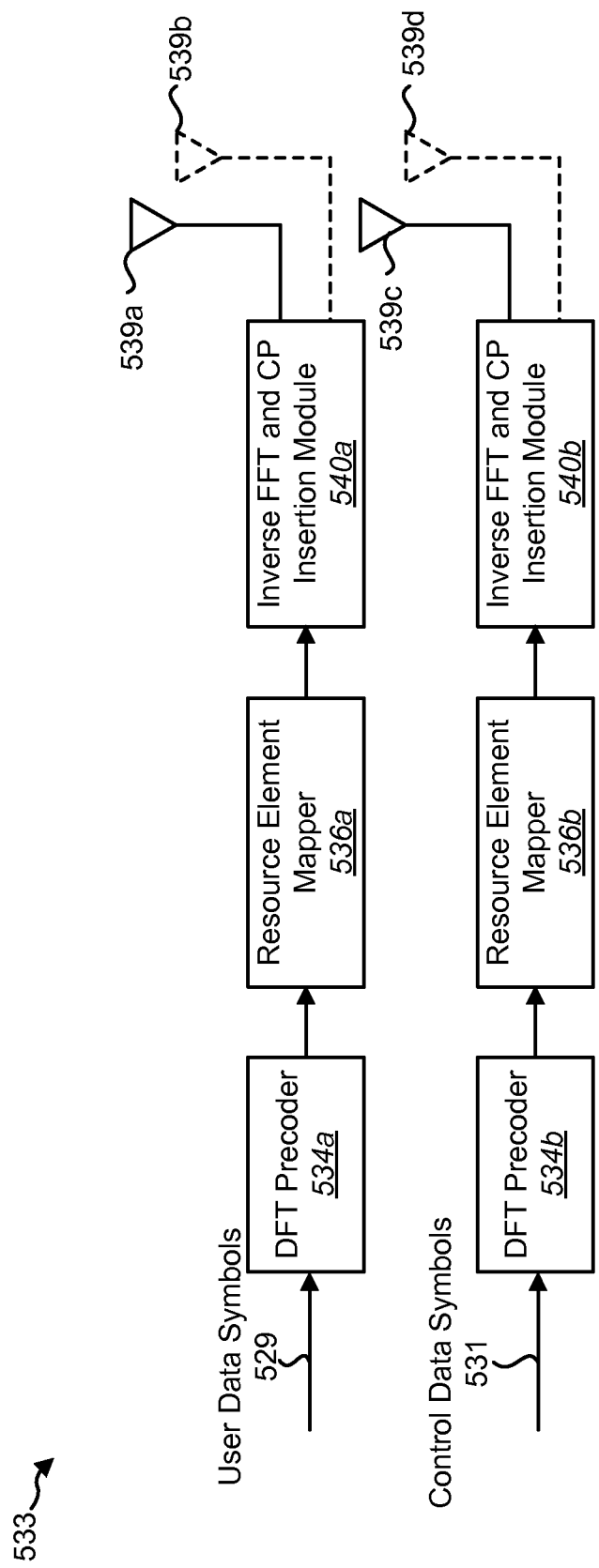
FIG. 5 is a block diagram illustrating one configuration of a DFT-Spread OFDM module.

FIG. 5 is a block diagram illustrating one configuration of a DFT-Spread OFDM module 533. In this configuration, precoding may be carried out in separate DFT precoders 534a-b. Specifically, a first DFT precoder 534a may precode the user data symbols 529 to produce a DFT of length $M_{sc}^{PUSCH}$, where $M_{sc}^{PUSCH}$ is the bandwidth of the original PUSCH transmission in terms of subcarriers. A second DFT precoder 534b may precode the control data symbols 531 to produce a DFT of length 12K, where K is the number of PUCCH bands being used. Additionally, the frequencies may be allocated for the precoded user data symbols 529 and the control data symbols 531 in two resource element mappers 536a-b, e.g., allocation of frequency in the PUSCH for the precoded user data symbols 529 and allocation of frequency in the PUCCH for the precoded control data symbols 531.

In other words, the DFT precoders 534 may transform the time domain complex sequences into frequency domain sequences. The length of the DFT may equal the number of input symbols as well as the number of output symbols. The output from the DFT precoders 534 may then be mapped into the time-frequency elements by the resource element mappers 536.

The output of the resource element mappers 536a-b may be inversely transformed by separate inverse FFT and cyclic prefix (CP) insertion modules 540a-b. The output signals of each inverse FFT and CP insertion module 540a-b may be transmitted on a single antenna or multiple antennas 539a-d. The antennas 639 used for the PUSCH or PUCCH may be identical.

Figure 6:
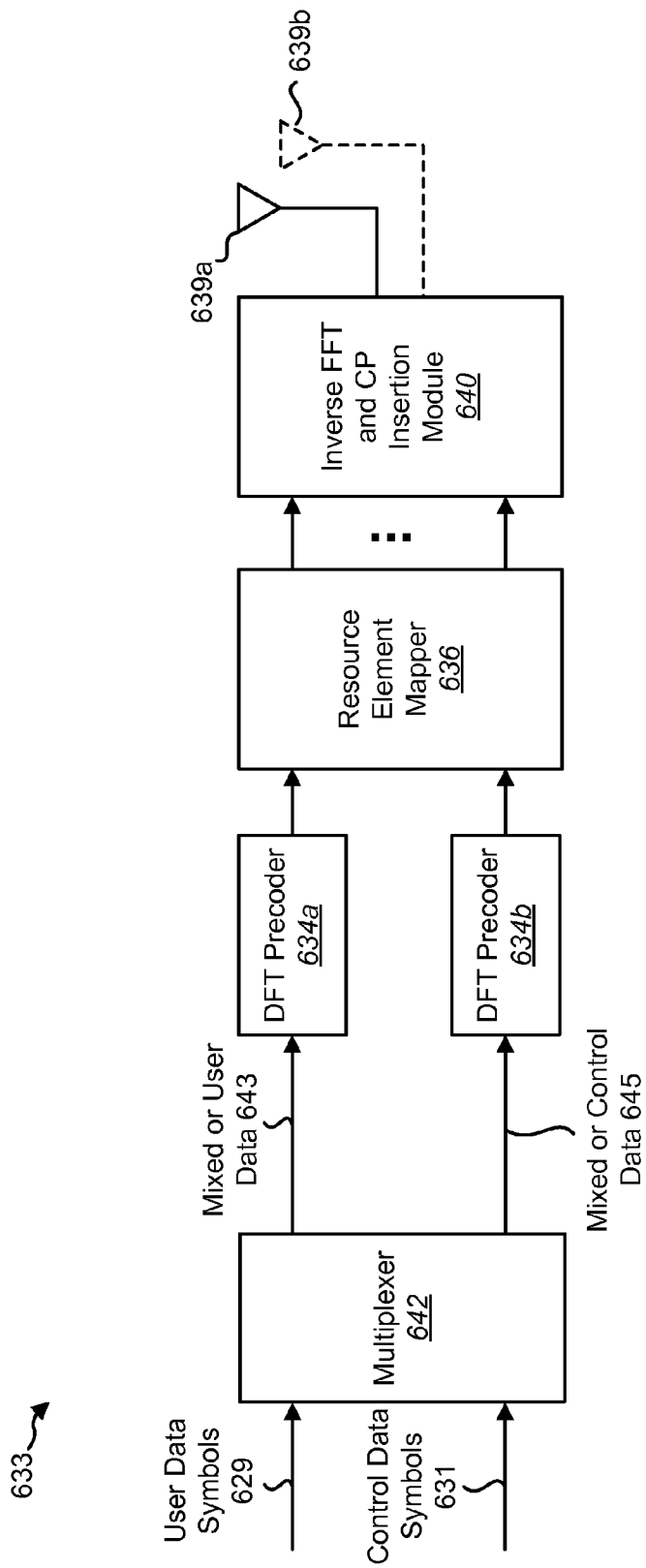
FIG. 6 is a block diagram illustrating another configuration of a DFT-Spread OFDM module.

FIG. 6 is a block diagram illustrating another configuration of a DFT-Spread OFDM module 633. As with previous paragraphs, the DFT-Spread OFDM module 633 may receive user data symbols 629 and control data symbols 631. In this configuration, the user data symbols 629 and the control data symbols 631 may be mixed, i.e., with a multiplexer 642. Alternatively, the user data symbols 629 and the control data symbols 631 may not be mixed. The mixed information or separate user data and control data may then be divided into two parts and processed with different transform pre-coding, i.e., mixed/user data 643 may be processed by a first DFT precoder 634a and mixed/control data 645 may be processed by a second DFT precoder 634b. In this configuration, however, frequencies may be allocated in the combined PUCCH and PUSCH so that the precoding is a DFT of length $M_{sc}^{PUSCH}+N_{sc}^{RB}*K$. The resource element mapper 636 may map the precoded mixed or user data 643 and the precoded mixed or control data 645 across portions of the PUCCH and PUSCH. As discussed above, this aggregate channel may be referred to herein as the Physical Uplink Channel (PUC). One possible value of $N_{sc}^{RB}$ is 12. In addition, spatial mapping may be done of the PUC, PUCCH, or PUSCH by the resource element mapper 636. In other words, spatial weighting and combining of signals may be performed by the resource element mapper 636 to control how signals may be transmitted when a plurality of antennas 639 is used. Then, an inverse FFT and CP insertion module 640 may be used to generate the transmitted signal that is sent on one or more antennas 639a-b.

Figure 7:
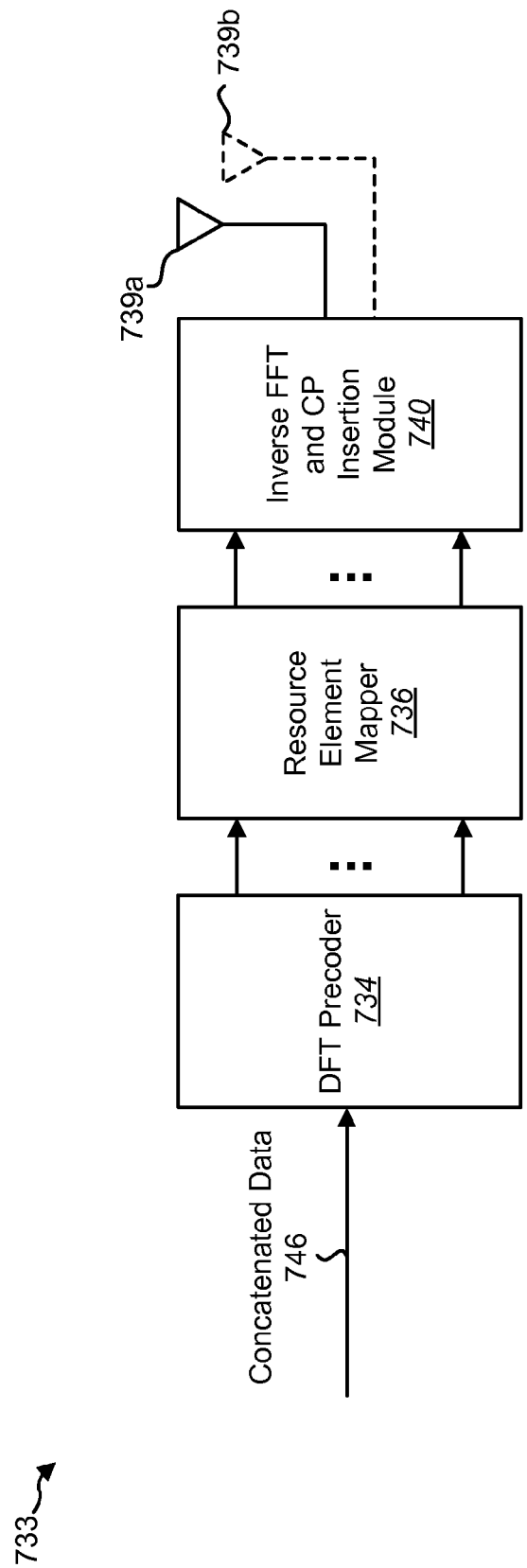
FIG. 7 is a block diagram illustrating another configuration of a DFT-Spread OFDM module.

FIG. 7 is a block diagram illustrating another configuration of a DFT-Spread OFDM module 733. In this configuration, the user data symbols 629 and the control data symbols 631 may be concatenated together to form concatenated data 746 and then go through a combined DFT-Spread OFDM process. Like the previous configuration, frequencies may be allocated in the combined PUCCH and PUSCH, i.e., a DFT precoder 734 may generate a DFT of length $M_{sc}^{PUSCH}+N_{sc}^{RB}*K$. The resource element mapper 736 may map the precoded concatenated data 746 across the PUC. An inverse FFT and CP insertion module 740 may be used to generate the transmitted signal that is sent on one or more antennas 739a-b.

Furthermore, a reference signal with a sequence length equal to $M_{sc}^{RS}=\phi N_{sc}^{RB}$ may be transmitted from the wireless communication device 104, where $\phi$ is the number of resource blocks in the combined bandwidth that was in the control region for the PUCCH as well as the PUSCH. The PUCCH regions for transmissions may be defined by a base station 102. This reference signal may include symbols that are used for channel estimation and compensation at the receiver for other received symbols. The reference signals may be predefined patterns that are mapped into the predefined time-frequency elements by the resource element mapper 736. The DFT output mapping may avoid any elements that are reserved for reference symbols.

Figure 8:
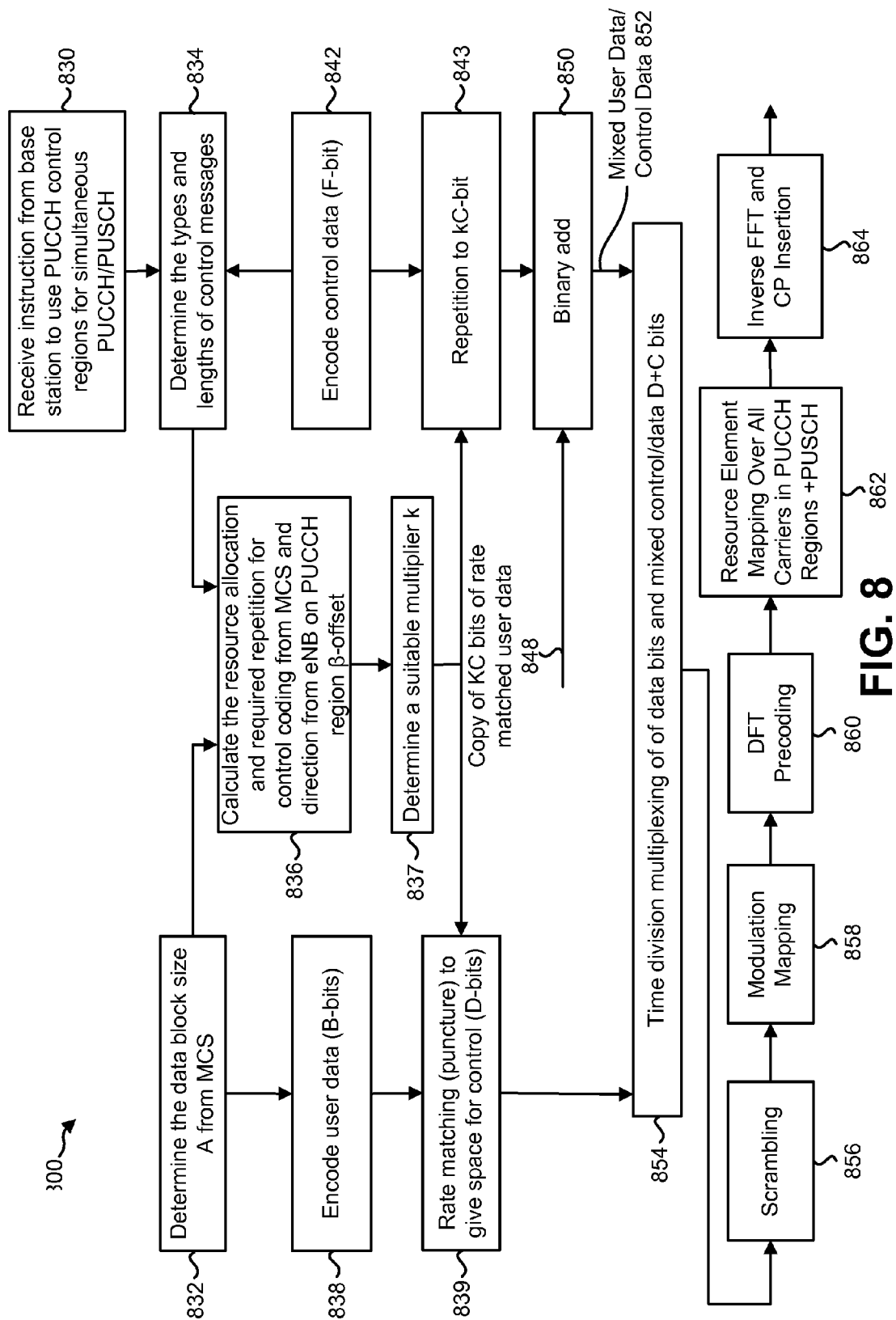
FIG. 8 is a flow diagram illustrating a method for mixed encoding.

FIG. 8 is a flow diagram illustrating a method 800 for mixed encoding. Specifically, the method 800 may be used with a system for transmitting user data and control data on a Physical Uplink Channel (PUC). The method 800 may be performed by a wireless communication device 104, e.g., a mixed encoder 106.

Through a scheduling mechanism in the base station 102 scheduling entity, the encoder 106 may receive 830 a message through the air interface directing it to use bandwidth for aggregated control channel resources in tandem with those for user data channel resources, i.e., to form a PUC from a PUCCH and a PUSCH. From the received instruction to form a PUC, the wireless communication device 104 may determine 834 types and lengths of the aggregate control messages to be transmitted back to the base station 102, given the fact that feedback may be requested on multiple component carriers. The uncoded control data may be E bits.

The encoder 106 may also determine 832 the user data block size, A, from the current modulation and coding scheme (MCS). The MCS may be provided by a base station 102. The mixed encoder 106 may also calculate 836 the resource allocation offset, β-offset, and repetition scalar, m, for control data coding. The repetition scalar m is the required number of repetitions of the coded control output to achieve the required β-offset over data coding. The resource allocation offset, β-offset, may describe the allocation between control data and user data and may be computed based on the particulars of the control data to be decoded, e.g., ACK/NACK alone, CQI alone, ACK/NACK+CQI, PMI, etc. The resource allocation offset, β-offset, may also be based on the user data block size, and the combined bandwidth for the uplink grant for the PUC. In certain cases this grant for a PUC may be periodic. A repetition scalar, m, may be determined based on the resource allocation offset, β-offset, and may determine the number of times control data is repeated. The mixed encoder 106 may also determine 837 a mixing scalar, k, that may also be used to determine the number of times control data is repeated. The mixing scalar, k, may be determined 837 based on a pre-defined algorithm from known parameters, e.g., MCS setting, type/size of control information, β-offset, etc. Alternatively, the mixing scalar, k, may be determined 837 from a lookup table of different input parameter combinations. The lookup table may be pre-defined and may be changed by mutual agreement between a base station 102 and a wireless communication device 104.

The mixed encoder 106 may also encode 838 the user data to produce B bits of encoded data. Likewise, the mixed encoder 106 may also encode 842 the control data into F bits. As before, the user data and control data may be coded separately using different coding techniques. The user data may be coded with a rate ⅓ Turbo code and the control data may be coded with a Reed-Muller code or ⅓ tail biting convolutional code.

The encoder may also rate match 839 the user data to give space for control data. The control data may be kC bits, where k is a mixing scalar. Therefore, the rate matching 839 may reduce the D bits of user data to (D−(k−1)C) bits to accommodate the kC bits of control data. The mixing encoder 106 may also repeat 843 the F bits of coded control data k*m times to produce kC bits.

Rather than combining the coded rate matched user data and the coded extended control data, the mixing encoder 106 may binary add 850 a copy of kC bits of the rate matched user data 848 with the coded control data. This may produce mixed user data/control data 852. The mixing encoder 106 may then combine 854 the coded rate matched user data with the mixed user data/control data block 852 using time division multiplexing (TDM).

The mixed encoder 106 may also scramble 856 the mix coded data. The mixed encoder 106 may also modulate 858 the scrambled bits to generate user data symbols. The mixed encoder 106 may also perform DFT precoding 860 as described in FIGS. 5-7. The mixed encoder 106 may also perform resource element mapping 862 over all carriers in the PUC, i.e., PUCCH regions and the PUSCH. The mixed encoder 106 may also perform inverse FFT and cyclic prefix insertion 864 to generate a complex-valued time-domain SC-FDMA signal for one or more antennas.

As an alternative configuration to the coding mechanism illustrated in FIG. 8, the process described in 3GPP RS 36.212 v9.0.0, section 5.2.2, may also be used to extend the regions defined in Release 8 into the control regions allocated for the PUC. For example, the following changes may be made:

1. $M_{sc}^{PUSCH}$, the bandwidth allocated for the PUSCH, may become $M_{sc}^{PUSCH}+N_{sc}^{RB} K$, and the same algorithms from Release 8 may be used with this replacement for $M_{sc}^{PUSCH}$.
2. $\beta_{offset}^{PUSCH}$ may change based on the new allocation of resources.

Figure 9:
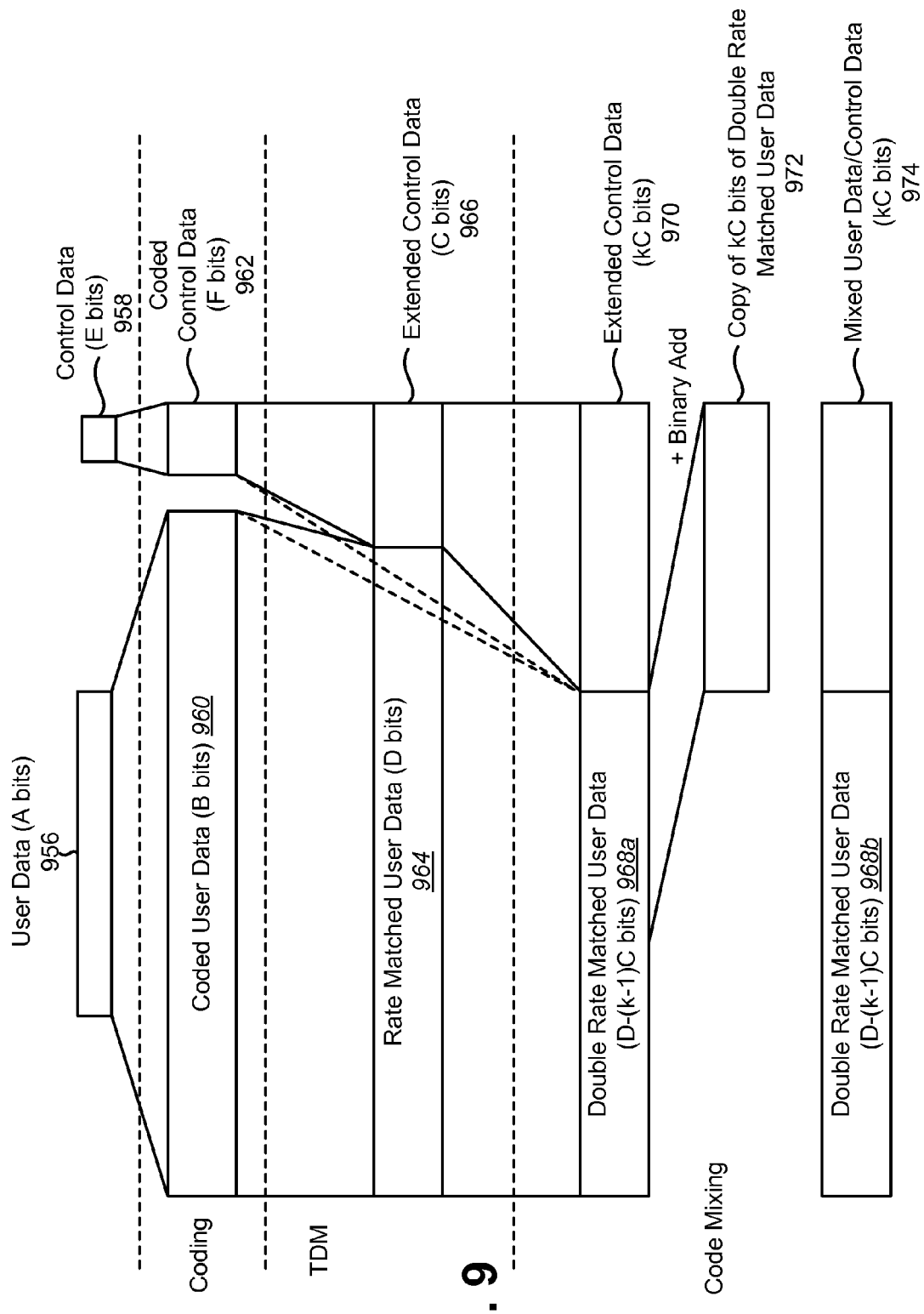
FIG. 9 is a block diagram illustrating time division multiplexing (TDM) and mixed encoding.

FIG. 9 is a block diagram illustrating time division multiplexing (TDM) and mixed encoding. In other words, FIG. 9 illustrates the relative size of data throughout the mixed coding process that may be used with a system for transmitting user data and control data on a Physical Uplink Channel (PUC). In communication systems, it is very common that different messages have different target error protection requirements, i.e. they require unequal error protection (UEP). A more important message may be much shorter than the other messages, such as user data, but may require more robust error protection. For example, control data 958 such as a Channel Quality Indicator (CQI) and acknowledgment/non-acknowledgment data (ACK/NACK) may require more error protection than user data 956.

One possible method to achieve UEP is to code the different messages separately and transmit in different time/frequency resource allocations. Specifically, UEP may be achieved by different code redundancy, such as coding rate, the number of repetitions, etc. For example, user data 956 and control data 958 on the long term evolution (LTE) physical uplink shared channel (PUSCH) are coded and transmitted separately using TDM. A resource allocation offset, β-offset, is defined to give better protection on the control data 958, so that β times resource is allocated to each control data bit compared with each user data information bit.

The control redundancy may be provided by a simple repetition of the coded control data 962 bits. The number of repetitions, may be denoted by a repetition scalar, m, that is calculated by the corresponding modulation, coding scheme (MCS) setting and the type/length of data and control. The coded user data 960 is rate matched to provide resources for the control allocation. The default resource allocation offset, β-offset, may be 20 times for ACK/NACK and rank indicator (RI), and 6.25 times for CQI. Although only one type of control message is illustrated in FIG. 9, the same technique applies to multiple control messages with different β-offsets.

The MCS setting provided by a base station 102 defines the total number of resource elements (REs) available for a subframe transmission, and the user data 956 transport block size A. The wireless communication device 104 (e.g., user equipment) may have the types/lengths of control messages to be transmitted in the current subframe, e.g. E bits of control data 958.

The user data 956 and control data 958 may be coded separately with the specified coding methods to B and F bits respectively. For example, in LTE, user data 956 may be coded with rate ⅓ Turbo code to produce coded user data (B bits) 960. In contrast, the control data 958 may use a different code, e.g., the CQI may be coded by a (32, O) Reed-Muller code when the length of the CQI is 11 bits or less, while the CQI may be coded by a ⅓ tail biting convolutional code when the length of the CQI is more than 11 bits. This may produce coded control data (F bits) 962.

The coded user data 960 and coded control data 962 may be adjusted and multiplexed with required control redundancy. Specifically, the coded user data 960 may be rate matched to fit into the resource elements (REs) of the current MCS setting. This may include puncturing bits in the coded user data 960 to give space for the control messages. The coded control data (F bits) 962 may be repeated m times to C bits, where m is a repetition scalar calculated based on the resource allocation offset, β-off set.

The rate matched user data (D bits) 964 may then be combined with the extended control data (C bits) 966 using TDM. However, this may not provide any interaction between the rate matched user data 964 and the extended control data 966.

The present systems and methods, however, include a code mixing mechanism to provide deterministic dependency between messages. Specifically, the present systems and methods mix coded control data with a block of repeated user data. Thus, an iterative feedback may be added to one message after the decoding of the other as follows. Furthermore, mixed coding explores the marginal distribution of two sets of codes, and may significantly improve the overall system performance.

In one configuration, mixed coding is implemented in LTE with minimum modifications on existing LTE schemes. The code may reuse the existing channel coder with a simple extra step at the encoder. At the decoder, the outputs of the decoders may feedback to each other, and reinforce the code performance. Three different feedback levels may be defined for decoding to get different levels of performance enhancement with different complexity. Level 1 is to feedback coded control only. Level 2 is to feedback decoded control thus control coding gain is utilized. Level 3 is to feedback decoded data output, thus the data coding gain is also explored. Analytical and simulation results show that mixed coding may increase performance compared with the standard time division multiplexing (TDM) scheme in LTE on physical uplink share channel (PUSCH).

For low rate settings where the user data coding rate is less than ⅓, better performance is achieved on user data and control data simultaneously. The user data performance is similar to that of user data only, as if no control data is added, thus better than the data performance in TDM. The control data may be spread into a larger portion, thus may be more reliable than control data in TDM version with 3 dB, 6 dB or even more coding gains depending on the spreading factor. This may be a particularly optimal use case for mixed coding.

For medium and high rate settings, the mixed coding may provide comparable performance even without Level 3 feedback, and better overall performance with Level 3 feedback. With the same user data performance as in TDM, a gain of 1.5 dB to 3 dB may be observed on control data. On the other hand, if the same control data performance is maintained, it may bring some performance gain over TDM.

Code mixing may utilize the user data and control data coding with an extra step of determined code block repetition and mixing. With a scale factor of k, the rate matched user data 964 may be rate matched again to produce double rate matched user data (D−(k−1)C bits) 968a. The extended control data 966 may be extended again using repetition to produce double extended control data (kC bits) 970. Alternatively, the double rate matched user data 968a may be produced by rate matching the coded user data (B bits) 960 directly using a resource allocation offset of β-offset=k* (given β-offset). Likewise, the double extended control data 970 may be produced by repeating the coded control data 962 directly using a repetition scalar m=k*m. The appropriate value of k may be decided by the operating channel condition. For example, k may be chosen as 2 or greater to give fast control decoding with comparable performance, or chosen between 1 and 2 if level 3 feedback is used.

A copy of kC bits of the double rate matched user data 972 may be taken from the double rate matched user data 968a and binary added with the extended control data (kC bits) 970. This may produce mixed user data/control data 974 that may be included in the final output along with the double rate matched user data 968b. Mathematically, the binary add may use a bitwise XOR operation.

Alternatively, if the coding rate used for the user data 956 is less than ⅓, a repetition block may already be present in the rate matcher. Therefore, the repetition block in the rate matcher may be used instead of implementing a second rate matcher.

Additionally, the determination of the mixing scalar, k, may be based on a pre-defined algorithm from other parameters, such as MCS setting, type/size of control information, resource allocation offset (β-offset), etc. The appropriate value may be evaluated by offline optimization functions for different data/control multiplexing settings. In implementation, the mixing scalar, k, may be a simple lookup table of different input parameter combinations. The table may be pre-defined. It may also be possible to make customized changes by mutual agreement between a base station 102 and a wireless communication device 104, e.g., an eNodeB and user equipment. Furthermore, the number of repetitions m in the user data and control data multiplexing, and the mixing scalar k may be non-integer numbers, i.e., m and k may also be fractional values.

Figure 10:
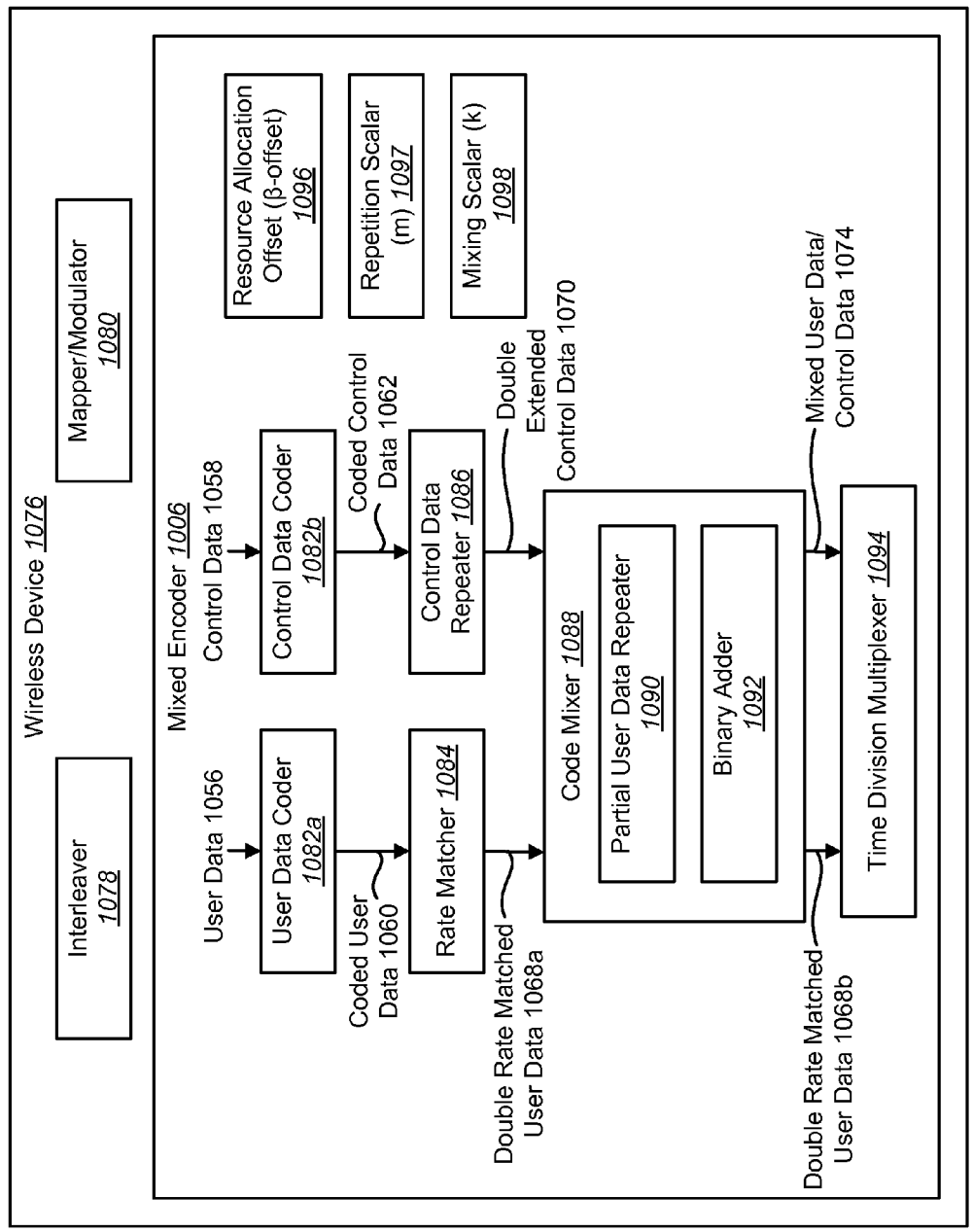
FIG. 10 is a block diagram illustrating a wireless device that uses mixed coding.

FIG. 10 is a block diagram illustrating a wireless device 1076 that uses mixed coding. The wireless device 1076 may be a base station 102 or a wireless communication device 104. A mixed encoder 1006 may receive a data stream that includes user data 1056 and control data 1058. A user data coder 1082a may encode the user data 1056 to produce coded user data 1060, e.g., using a ⅓ Turbo decoder. A control data coder 1082b may encode the control data 1058 to produce coded control data 1062, e.g., using a Reed-Muller code or a ⅓ tail biting convolutional code. The coded user data 1060 may be rate matched in a rate matcher 1084 to produce double rate matched user data 1068a. The coded control data 1062 may be extended in a control data repeater 1086 to produce double extended control data 1070. This may include repeating the coded control data 1062 a number of times indicated by the repetition scalar 1097, m, and a mixing scalar 1098, k, i.e., the bits in the coded control data 1062 may be repeated k*m times to produce the double extended control data 1070. The repetition scalar 1097 may be determined by a resource allocation offset 1096, β-offset, received from a base station 102. The mixing scalar 1098, k, may be determined based on a pre-defined algorithm from other parameters, such as MCS setting, type/size of control information, resource allocation offset 1096, β-offset, etc.

Alternatively, the rate matching of the coded user data 1060 may include an intermediate step, not shown, where the coded user data 1060 is rate matched into rate matched user data 964 that is then rate matched again into double rate matched data 1068a. Similarly, the extending of the coded control data 1062 into double extended control data 1070 may include an intermediate step, not shown, where the coded control data 1062 is extended into extended control data 966 that is then extended again into double extended control data 1070. If the intermediate step is used, the extended control data 966 may include C bits while the double extended control data 1070 may include kC bits. Thus, the double extended control data 1070 may include k multiples of the number of bits included in the extended control data 966.

A code mixer 1088 may copy a portion (kC bits) of the double rate matched user data 1068a using a partial user data repeater 1090. The copy of kC bits of double rate matched user data 972 may be added to the double extended control data 1070 to produce mixed user data/control data 1074. The binary adding may be performed by a binary adder 1092. The double rate matched user data 1068b and the mixed user data/control data 1074 may be combined in a time division multiplexer 1094. After encoding, the combined output of the mixed encoder may be interleaved and mapped or modulated by an interleaver 1078 and a mapper/modulator 1080.

Figure 11:
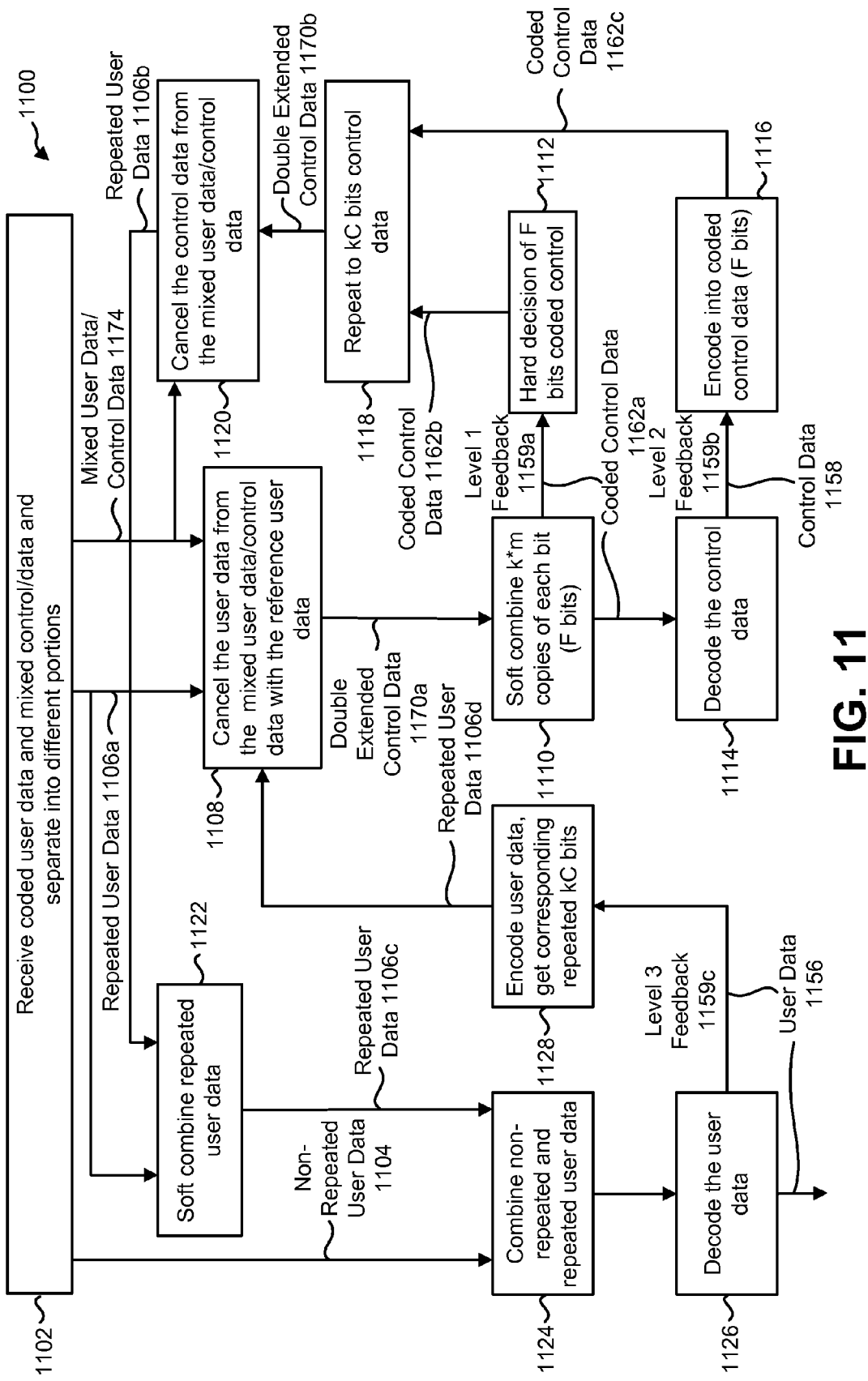
FIG. 11 is a flow diagram illustrating a method for mixed decoding.

FIG. 11 is a flow diagram illustrating a method 1100 for mixed decoding. The method 1100 may be performed by a mixed decoder 108 on a base station 102 or a wireless communication device 104. Data described in the mixed decoder 108 as corresponding to data in a mixed encoder 106 may be estimates of such data, and therefore, may include differences. Additionally, data described in the mixed decoder 108 may be in soft form, (e.g., log likelihood ratios (LLRs)), or hard form, i.e., a form that includes no indication of probability or reliability of the data.

With a determined user data code repetition, the "dirty paper" of the control message may be known. Therefore, at the receiver, the dirty channel may be cancelled first from the mixed user data/control data to get the coded control data. Then the coded control data may be cancelled to get another copy of the repeated user data. The soft combining of two copies of the repeated user data may provide better received signal quality, thus gain on the data decoding.

Furthermore, the outputs from the control data and user data decoding may feedback to each other to give extra gain. There may be 3 possible feedback levels with different complexity. Level 1 may feedback coded control data only. Level 2 may feedback decoded control data thus control data coding gain is utilized. Level 3 may feedback decoded user data output, thus user data coding gain is also explored.

The mixed decoder 108 may receive 1102 coded user data and mixed user data/control data 1174. The coded user data may be separated into non-repeated user data 1104 and repeated user data 1106a. The non-repeated data 1104 may be the portion of the received user data that was not binary added with the control data at the mixed encoder 106, i.e., the non-copied portion of the double rate matched user data 968a illustrated in FIG. 9. The repeated user data 1106a may be the portion (kC bits) of the received user data that was binary added with the control data at the mixed encoder 106, i.e., the copied portion of the double rate matched user data 968a illustrated in FIG. 9. The mixed user data/control data 1174 may be the binary added portion of the received data, i.e., the mixed user data/control data 974 illustrated in FIG. 9.

The mixed decoder 108 may use the repeated user data 1106a as reference, and cancel 1108 the user data portion of the mixed user data/control data 1174 to produce double extended control data 1170a. The bit log likelihood ratio (LLR) soft output may be obtained by the bit LLRs of the mixed user data/control data 1174 and repeated user data 1106a. This is essentially a differential decoding.

The mixed decoder 108 may then soft combine 1110 k*m copies of each bit in the double extended control data 1170a to produce coded control data (F bits) 1162a. This may be done by simply adding the LLRs of k*m copies of the same bit.

If level 1 feedback 1159a is used, the mixed decoder 108 may use the hard decision 1112 to determine the hard coded control data 1162b from the soft coded control data 1162a. This may include converting LLRs of the soft coded control data 1162a into hard, non-LLR coded control data 1162b, i.e., the hard coded control data 1162b may not indicate probability or reliability of data. The hard coded control data 1162b may then be repeated 1118 into double extended control data 1170b. Alternatively, if level 2 feedback 1159b is used, the coded control data 1162a may be decoded 1114 to produce control data 1158 that may then be re-encoded 1116 into coded control data 1162c. The coded control data 1162c may then be repeated 1118 into double extended control data 1170b.

The mixed decoder 108 may produce another copy of the repeated user data 1106b by canceling 1120 the double extended control data 1170b from the mixed user data/control data 1174. The soft LLR data output of the mixed block may be obtained by flipping the LLR polarity when the corresponding control data bit is 1. The mixed decoder 108 may soft combine 1122 the two versions of the repeated user data 1106, i.e., the received repeated user data 1106a and the determined repeated user data 1106b. This may give a better signal quality to a user data decoder. The combining may be a sum of the LLRs of the two versions of repeated user data 1106, i.e., one from the transmission, one from the canceling 1120.

The mixed decoder 108 may combine 1124 and decode 1126 the combined repeated user data 1106c and the non-repeated user data 1104 to produce user data 1156. The improved input signal quality results in improved user data code performance.

Additionally, enhanced control performance may be obtained by using level 3 feedback 1159c of the user data 1156. If level 3 feedback 1159c is used, the mixed encoder may encode 1128 the user data 1156 to produce corresponding repeated user data 1106d. The mixed decoder 108 may then cancel 1108 the repeated user data 1106d from the mixed data/control data 1174. This may provide a cleaner version of the double extended control data 1170a. The mixed decoder 108 may then repeat the control decoding again.

An iterative process is possible to maximize the performance gain on both user data and control data. However, in most cases, one iteration may be sufficient to achieve desired performance. For fractional m and k values, the last fractional copy may be padded with all 0 values during the soft combining of LLR in the process above.

In the mixed decoding process, the control message, (i.e., the control data 1158) may be recovered by comparing the repeated user data 1106a and the mixed user data/control data 1174. This may be equivalent to transmitting the control data 1158 over a noisier channel because the noises on the two blocks are added together during the decoding process. A larger k may increase the control coding redundancy and may alleviate the increased noise. After the control data 1158 decoding, both level 1 feedback 1159a and level 2 feedback 1159b may provide cleaner coded control data 1162b-c, thus improving the repeated user data 1106b signal quality and the user data performance. Level 3 feedback 1159c may provide further enhancement by providing cleaner user data 1156 to the mixed block, thus the control data performance may be increased.

With one or more iterations, the error residue from the user data decoding 1126 and control data decoding 1114 may be very small. The equivalent user data and control data performance, assuming ideal cancellation of each other, may become the performance limits. Received user data may become double rate matched user data with kC bits block repetition, and received control data may become double extended control data 1170 (kC bits) with approximately 10*log 10(k) dB gain.

For low rate settings where the data coding rate is less than ⅓, mixed coding may provide better performance on user data and control data simultaneously. In this case, the control data mixing is added directly to the rate matched user data. Therefore, with control data cancellation, the user data performance is similar to that of user data only as if no control data is added, thus mixed coding may perform better than the user data in TDM. Additionally, the control data may be spread into a large portion, which may cause higher reliability than the TDM control data.

Low code rates may be used on nearly 50% of all MCS settings. Also, low code rates used more in poor channel quality, such as cell edge cases, may be vulnerable to large control data overhead. Mixed coding may be a particularly appealing solution to provide relatively large gains on both control data and user data. In fact, mixed coding may provide more gain when the control data overhead is large.

For medium and high rate settings, mixed coding may provide comparable performance even without level 3 feedback 1159c, and better overall performance with level 3 feedback 1159c. With the same data performance as in TDM, 1.5 dB-3 dB gain may be observed on control data. On the other hand, if the same control data performance is maintained, it may bring some user data performance gain over TDM.

As an example, with a nominal ⅓ code rate user data and 3 to 1 coded user data and control data TDM allocation, coded user data may be rate matched to rate ½, and the whole data block may be repeated and mixed with k=2 times expanded coded control data. Mixed coding may achieve 0.6 dB performance gain on user data and 3 dB gain on control data simultaneously over the TDM version. This may be translated to 15% less transmission power to achieve the same TDM data performance with 50% less control data error than TDM version.

Figure 12:
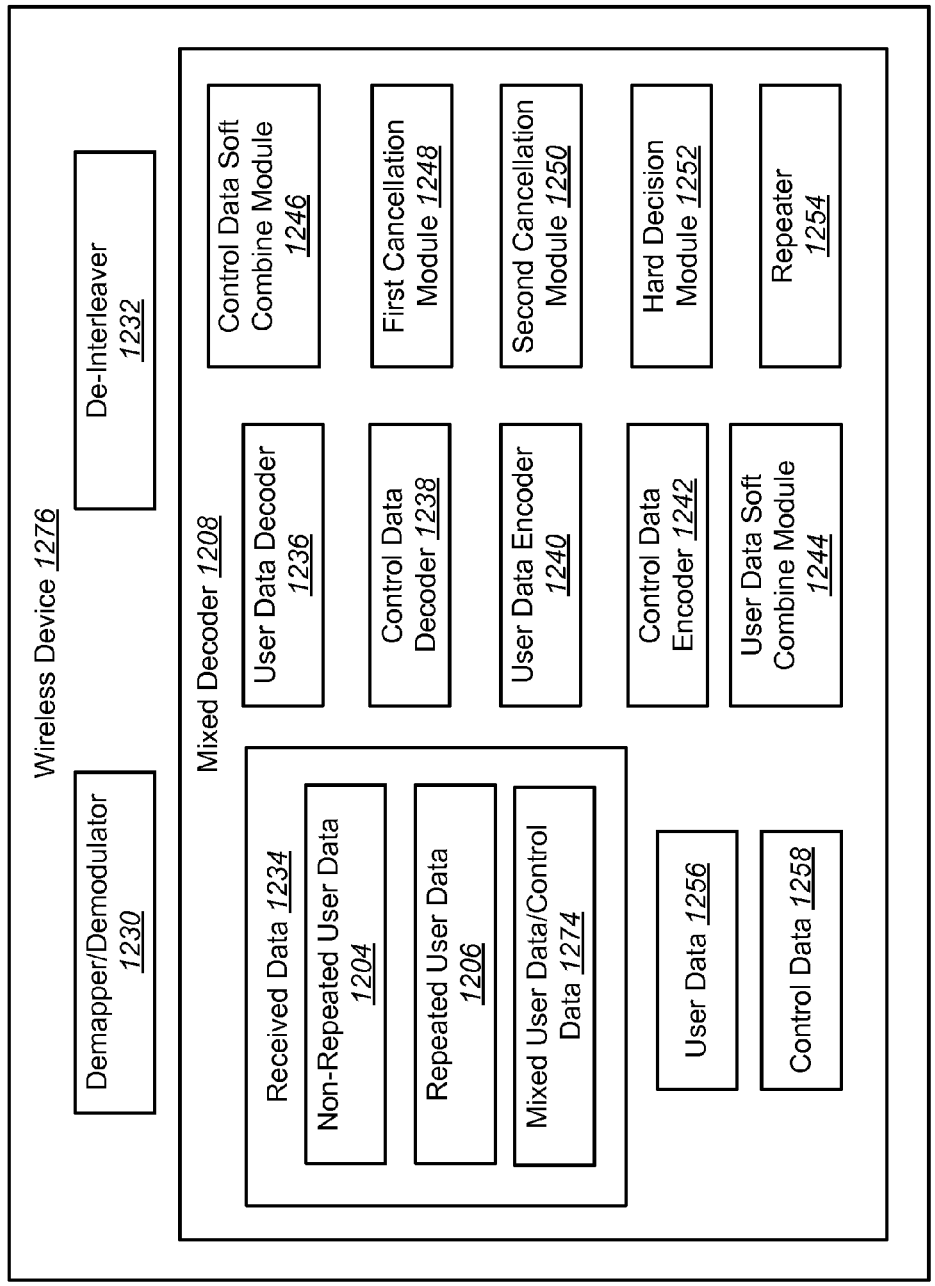
FIG. 12 is a block diagram illustrating a wireless device that uses mixed decoding.

FIG. 12 is a block diagram illustrating a wireless device 1276 that uses mixed decoding. The wireless device 1276 may be a base station 102 or a wireless communication device 104. A demapper/demodulator 1230 and a de-interleaver 1232 may demap or demodulate and de-interleave a received signal, respectively.

A mixed decoder 1208 may use received data 1234 to produce user data 1256 and control data 1258. In other words, the non-repeated user data 1204, repeated user data 1206, and mixed user data/control data 1274 illustrated in FIG. 12 correspond to the non-repeated user data 1104, repeated user data 1106, and mixed user data/control data 1174 illustrated in FIG. 11. To perform the decoding, the mixed decoder 1208 may use a user data decoder 1236 and a control data decoder 1238. The user data decoder 1236 may decode user data and may correspond to a user data coder 682a illustrated in FIG. 6, e.g., a ⅓ Turbo decoder. The control data decoder 1238 may decode control data and may correspond to a control data coder 682b illustrated in FIG. 6, e.g., a Reed-Muller decoder or a ⅓ tail biting convolutional decoder.

The mixed decoder 1208 may also include a user data encoder 1240 and a control data encoder 1242, a user data soft combine module 1244, a control data soft combine module 1246, a first cancellation module 1248, a second cancellation module 1250, a hard decision module 1252, and a repeater 1254 that are used in steps 1128, 1116, 1122, 1110, 1108, 1120, 1112, and 1118 illustrated in FIG. 11, respectively. Specifically, the user data encoder 1240 may be used to produce the user data 1256 and the control data encoder 1242 may be used to produce the control data 1258. The user data soft combine module 1244 may produce repeated user data 1206 and the control data soft combine module 1246 may produce coded control data 1162a. The first cancellation module 1248 and the second cancellation module 1250 may remove the repeated user data 1106a and the double extended control data 1170b from the mixed user data/control data 1174, respectively. The hard decision module 1252 may convert soft coded control data 1162a into hard coded control data 1162b. The repeater 1254 may repeat, or extend, the bits in coded control data 1162 to produce double extended control data 1170b.

Figure 13:
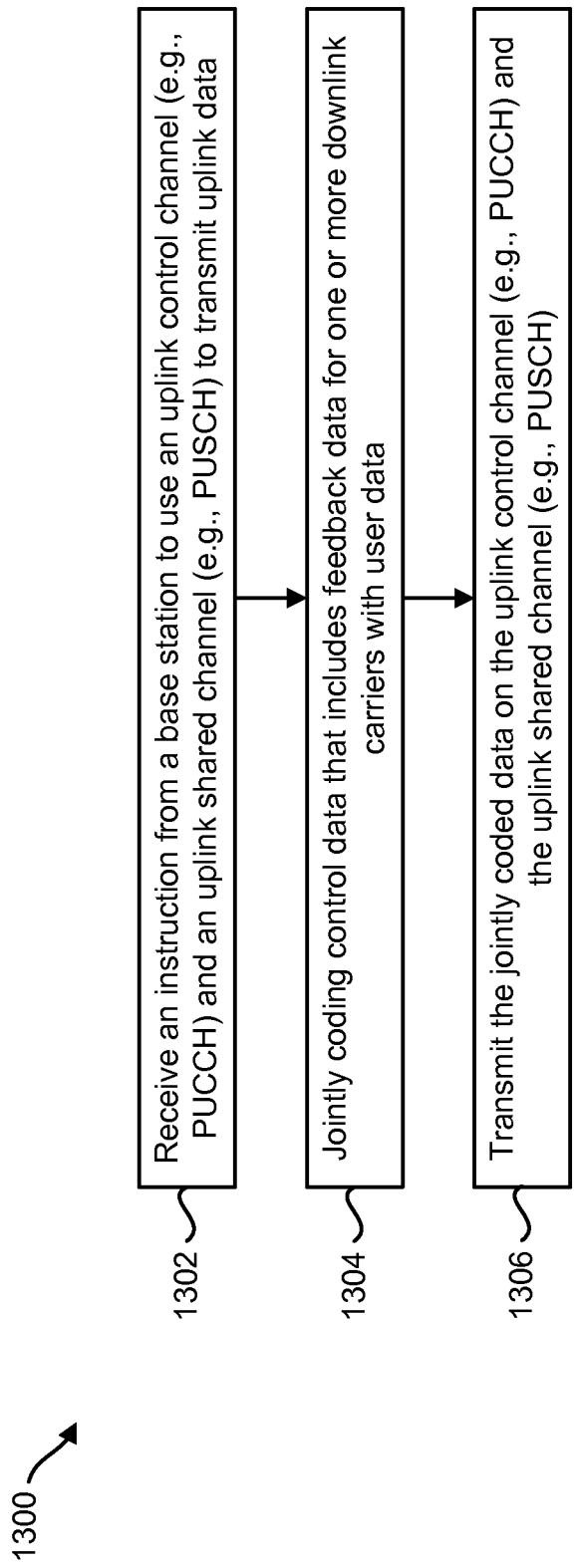
FIG. 13 is a flow diagram illustrating a method for transmitting control data and user data on a Physical Uplink Channel (PUC)

FIG. 13 is a flow diagram illustrating a method 1300 for transmitting control data and user data on a Physical Uplink Channel (PUC). The method 1300 may be performed by a wireless communication device 104. The wireless communication device 104 may receive 1302 an instruction from a base station 102 to use an uplink control channel and an uplink shared channel to transmit uplink data. In other words, the instruction may give the wireless communication device 104 permission to aggregate portions of the PUCCH and the PUSCH to form a Physical Uplink Channel (PUC) and transmit both user data and control data over the PUC simultaneously. The wireless communication device 104 may also jointly code 1304 control data that includes feedback data for one or more downlink carriers with user data, e.g., using the mixed coding described above. The wireless communication device 104 may also transmit 1306 the jointly coded data on the uplink control channel and the uplink shared channel, i.e., on the PUC. This transmission on both the uplink control channel and uplink shared channel may be simultaneous.

Figure 14:
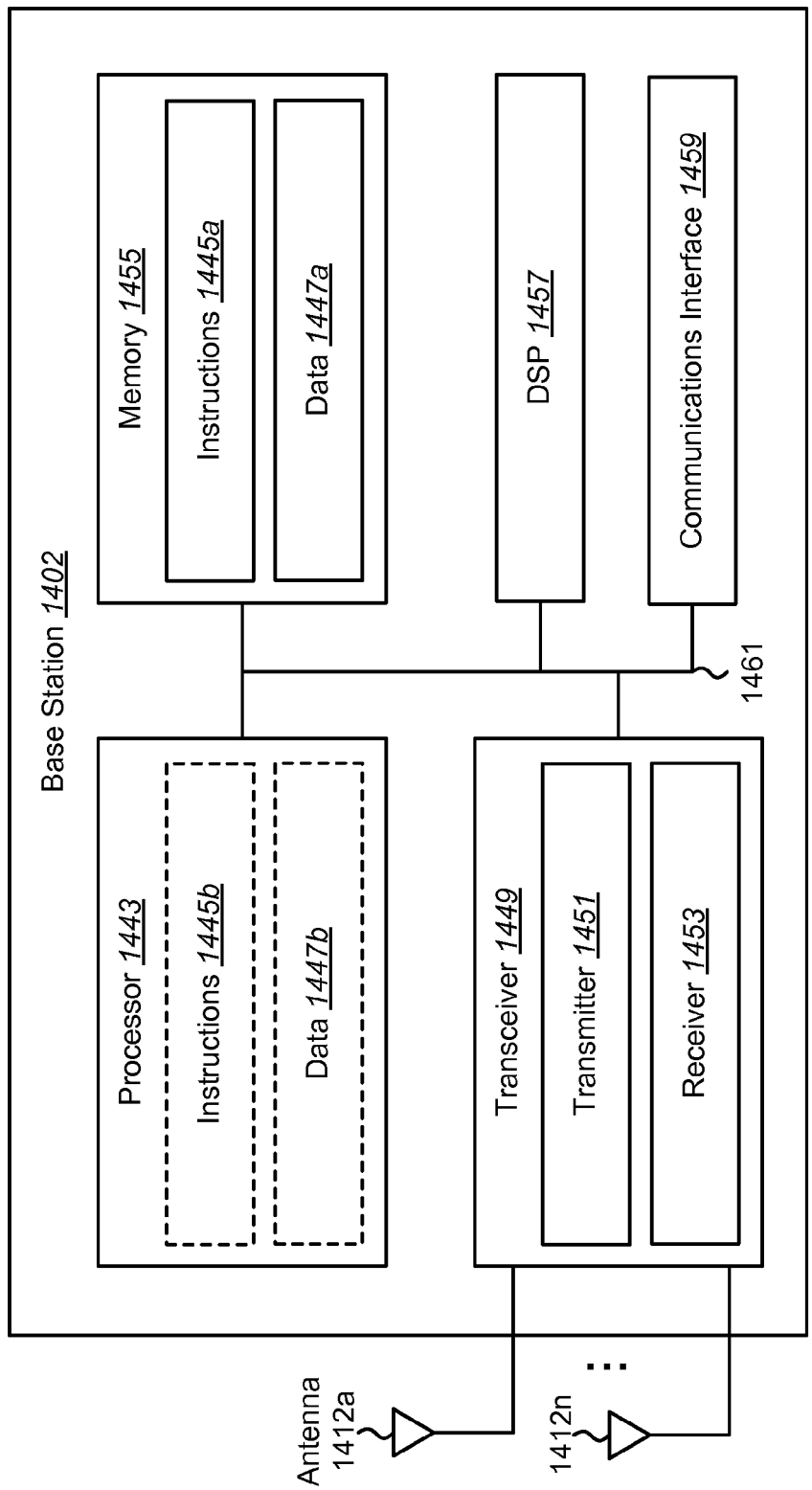
FIG. 14 illustrates various components that may be utilized in a base station.

FIG. 14 illustrates various components that may be utilized in a base station 1402. The base station 1402 may be utilized as the base station 102 in FIG. 1. The base station 1402 includes a processor 1443 that controls operation of the base station 1402. The processor 1443 may also be referred to as a CPU. Memory 1455, which may include both read-only memory (ROM), random access memory (RAM) or any type of device that may store information, provides instructions 1445a and data 1447a to the processor 1443. A portion of the memory 1455 may also include non-volatile random access memory (NVRAM). Instructions 1445b and data 1447b may also reside in the processor 1443. Instructions 1445b loaded into the processor 1443 may also include instructions 1445a from memory 1455 that were loaded for execution by the processor 1443. The instructions 1445b may be executed by the processor 1443 to implement the methods disclosed herein.

The base station 1402 may also include a housing that contains a transmitter 1451 and a receiver 1453 to allow transmission and reception of data. The transmitter 1451 and receiver 1453 may be combined into a transceiver 1449. One or more antenna 1412a-n are attached to the housing and electrically coupled to the transceiver 1449.

The various components of the base station 1402 are coupled together by a bus system 1461 which may include a power bus, a control signal bus, and a status signal bus, in addition to a data bus. However, for the sake of clarity, the various buses are illustrated in FIG. 14 as the bus system 1461. The base station 1402 may also include a digital signal processor (DSP) 1457 for use in processing signals. The base station 1402 may also include a communications interface 1459 that provides user access to the functions of the base station 1402. The base station 1402 illustrated in FIG. 14 is a functional block diagram rather than a listing of specific components.

Figure 15:
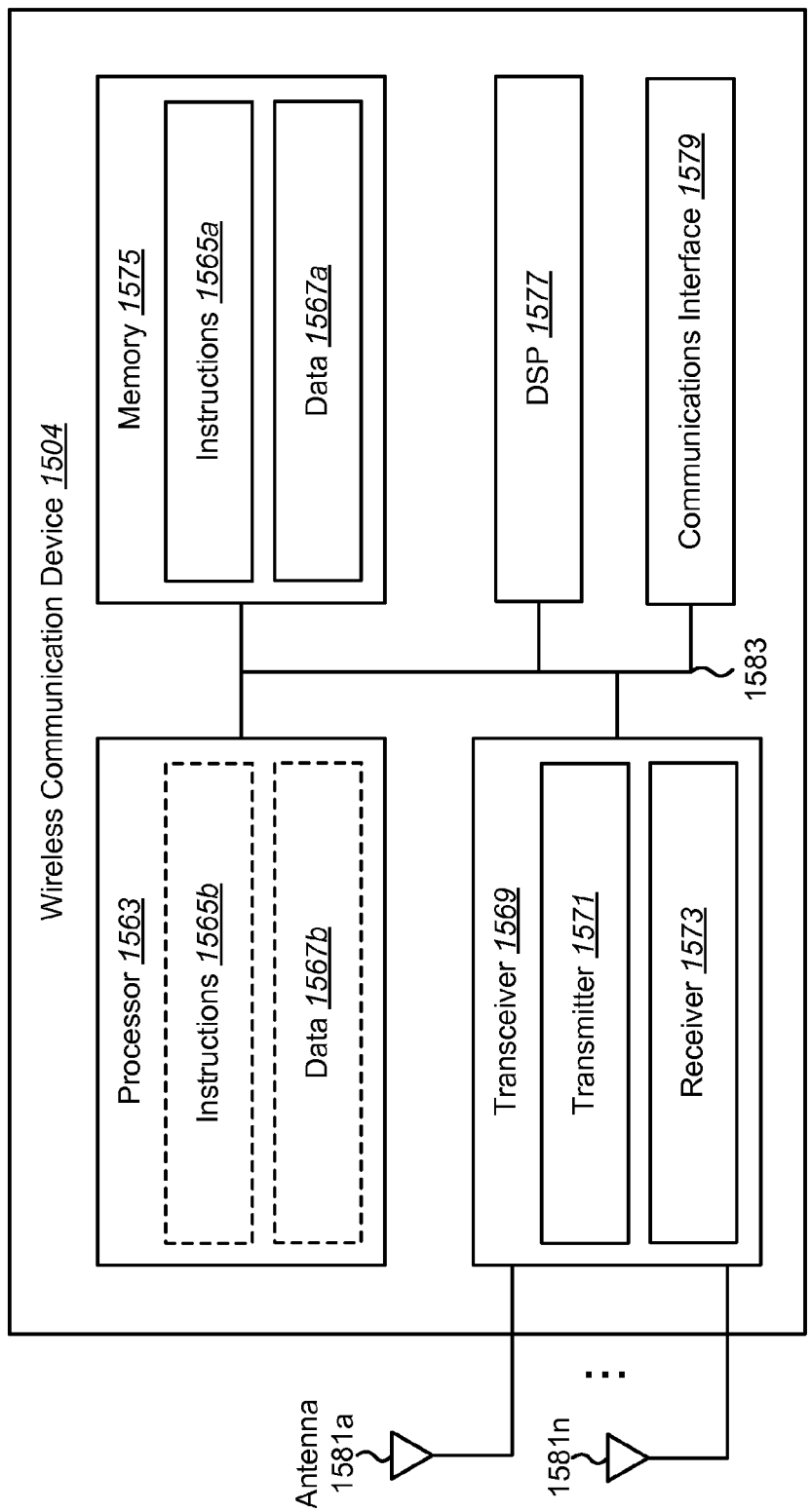
FIG. 15 illustrates various components that may be utilized in a wireless communication device.

FIG. 15 illustrates various components that may be utilized in a wireless communication device 1504. The wireless communication device 1504 may be utilized as the wireless communication device 104 in FIG. 1. The wireless communication device 1504 may include components that are similar to the components discussed above in relation to the base station 1402, including a processor 1563, memory 1575 that provides instructions 1565a and data 1567a to the processor 1563, instructions 1565b and data 1567b that may reside in the processor 1563, a housing that contains a transmitter 1571 and a receiver 1573 (which may be combined into a transceiver 1569), one or more antennas 1581a-n electrically coupled to the transceiver 1569, a bus system 1583, a DSP 1577 for use in processing signals, a communications interface 1579, and so forth.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for transmission of control data and user data on a Physical Uplink Channel (PUC), comprising:
   receiving an instruction from a base station to use an uplink control channel and an uplink shared channel to transmit uplink data;
   mixed coding the control data with the user data, comprising:
   removing bits in user data;
   repeating bits in control data to increase a number of bits in the control data, wherein the repeating comprises copying bits in the control data k*m times, where k is a constant determined based on a type and size of the control data, a resource allocation offset, β-offset, and a modulation and coding scheme (MCS), and m is a repetition scalar determined based on the resource allocation offset, β-offset;
   copying a number of bits in the user data that is equal to the number of bits in the control data;
   adding the copied user data bits to the control data; and
   multiplexing the user data and the control data; and
   transmitting control data and user data to the base station on the uplink control channel and the uplink shared channel.

2. The method of claim 1, wherein the transmitting is simultaneous on the uplink control channel and the uplink shared channel.

3. The method of claim 1, wherein the uplink control channel is a Physical Uplink Control Channel (PUCCH) in a Long Term Evolution (LTE) system and the uplink shared channel is a Physical Uplink Shared Channel (PUSCH) in an LTE system.

4. The method of claim 1, further comprising transmitting a reference signal with a length of M=Φ*N, where Φ is a combined number of resource blocks in the uplink control channel and uplink shared channel and N is a size of the resource blocks in frequency domain, expressed as a number of subcarriers.

5. The method of claim 1, wherein the control data comprises feedback data for a plurality of downlink carriers.

6. The method of claim 1, wherein the control data is one or more of a channel quality information (CQI), acknowledgment/non-acknowledgment data (ACK/NACK), precoding matrix indication (PMI), scheduling request (SR) and a rank indicator (RI).

7. A method for transmission of control data and user data on a Physical Uplink Channel (PUC), comprising:
   receiving an instruction from a base station to use an uplink control channel and an uplink shared channel to transmit uplink data;
   mixed coding the control data with the user data, comprising:
   removing bits in user data;
   repeating bits in control data to increase a number of bits in the control data;
   copying a number of bits in the user data that is equal to the number of bits in the control data;
   adding the copied user data bits to the control data, wherein the adding comprises a bitwise exclusive or (XOR) operation; and
   multiplexing the user data and the control data; and transmitting control data and user data to the base station on the uplink control channel and the uplink shared channel.

8. The method of claim 7, wherein the multiplexing comprises time division multiplexing (TDM) and channel multiplexing.

9. A wireless device for transmission of control data and user data on a Physical Uplink Channel (PUC), comprising:
   a processor;
   memory in electronic communication with the processor; and
   instructions stored in the memory, the instructions being executable by the processor to:
      receive an instruction from a base station to use an uplink control channel and an uplink shared channel to transmit uplink data;
      mixed code the control data with the user data, comprising instructions executable to:
         remove bits in user data;
         repeat bits in control data to increase a number of bits in the control data, wherein the instructions executable to repeat comprise instructions executable to copy bits in the control data k*m times, where k is a constant determined based on a type and size of the control data, a resource allocation offset, β-offset, and a modulation and coding scheme (MCS), and m is a repetition scalar determined based on the resource allocation offset, β-offset;
         copy a number of bits in the user data that is equal to the number of bits in the control data;
         add the copied user data bits to the control data; and
         multiplex the user data and the control data; and
      transmit control data and user data to the base station on the uplink control channel and the uplink shared channel.

10. The wireless device of claim 9, wherein the instructions executable to transmit comprise instructions executable to simultaneously transmit on the uplink control channel and the uplink shared channel.

11. The wireless device of claim 9, wherein the uplink control channel is a Physical Uplink Control Channel (PUCCH) in a Long Term Evolution (LTE) system and the uplink shared channel is a Physical Uplink Shared Channel (PUSCH) in an LTE system.

12. The wireless device of claim 9, further comprising instructions executable to transmit a reference signal with a length of $M=\Phi*N$, where $\Phi$ is a combined number of resource blocks in the uplink control channel and uplink shared channel and N is a size of the resource blocks in frequency domain, expressed as a number of subcarriers.

13. The wireless device of claim 9, wherein the control data comprises feedback data for a plurality of downlink carriers.

14. The wireless device of claim 9, wherein the control data is one or more of a channel quality information (CQI), acknowledgment/non-acknowledgment data (ACK/NACK), precoding matrix indication (PMI), scheduling request (SR) and a rank indicator (RI).

15. A wireless device for transmission of control data and user data on a Physical Uplink Channel (PUC), comprising:
   a processor;
   memory in electronic communication with the processor; and
   instructions stored in the memory, the instructions being executable by the processor to:
      receive an instruction from a base station to use an uplink control channel and an uplink shared channel to transmit uplink data;
      mixed code the control data with the user data, comprising instructions executable to:
         remove bits in user data;
         repeat bits in control data to increase a number of bits in the control data;
         copy a number of bits in the user data that is equal to the number of bits in the control data;
         add the copied user data bits to the control data, wherein the instructions executable to add comprise instructions executable to perform a bitwise exclusive or (XOR) operation; and
         multiplex the user data and the control data; and
      transmit control data and user data to the base station on the uplink control channel and the uplink shared channel.

16. The wireless device of claim 15, wherein the instructions executable to multiplex comprise instructions executable to perform time division multiplexing (TDM) and channel multiplexing.

* * * * *